UNITED STATES PATENT OFFICE.

CHESTER B. DURYEA, OF CARDINAL, ONTARIO, CANADA.

PROCESS OF REFINING SYRUP.

No. 916,683.         Specification of Letters Patent.         Patented March 30, 1909.

Application filed March 20, 1907. Serial No. 363,446.

*To all whom it may concern:*

Be it known that I, CHESTER B. DURYEA, a citizen of the United States, and resident of Cardinal, in the county of Greenville, Province of Ontario, Canada, have invented a new and useful Process of Refining Syrup, of which the following is a specification.

My invention relates to a process of refining syrups derived from modified starch with the object in view of simplifying the process and reducing the cost of refining.

The syrups to which my refining process is at present applied are what are known in the art as maltose and glucose obtained from the conversion of a modified or thin boiling starch and the process broadly consists in introducing a coagulating agent into the syrup obtained by the conversion of the modified starch, heating the mass, filtering, treating with a small amount of bone-char and again filtering. Concentration may then follow.

In detail, my process is practically carried on as follows:—The thin syrups or so called first light liquors derived from the modified starch, whether the conversion be produced by diastatic or acid hydrolysis, as in the manufacture of maltose, or by treating the thin boiling charge with acid, as in the manufacture of glucose, are given a coagulating treatment with some suitable agent, for example, tannic acid.

The tannic acid may be added in an amount equivalent to about one part of the reagent to about 4800 parts of syrup.

The tannic acid is preferably dissolved in a small quantity of water for its incorporation with the syrups and the mass at a specific gravity of about 17° Baumé is preferably heated to about 80° to 90° C., or even briefly boiled and then filtered.

It is desirable to introduce the reagent in such proportion as to produce a slight excess of tannic acid in the filtrate after treatment.

When the bone-char is used in its ground form, a form at present preferred, a small amount of ground, well-tempered and washed bone-char is then added, preferably in a moist condition and kept well stirred in.

The relative amount of the char may be varied within wide limits. The minimum amount, however, is fixed at that which is necessary to insure the complete removal of the slight excess of tannic acid remaining in the filtrate. The actual percentage of this minimum amount will further depend upon the character of the bone-char itself.

If the char be of an average good quality, which preferably has been revivified or re-burned several times before being used for this purpose, about $2\frac{1}{2}$ pounds of the char per 100 pounds of syrup on a basis of a density of about 42° Baumé will be sufficient to remove the tannic acid excess and such remaining gluten as might cause haziness on subsequent concentration and to produce a degree of decolorization sufficient for many commercial purposes. This refined light liquor is filtered with or without a small amount of some suitable clarifying agent, for example, alumina cream, in order to insure removal of all particles of the finely ground char or other suspended matters and it may then be concentrated without any further refining treatment.

What I claim is:—

1. A process of refining syrups obtained from modified or thin boiling starch consisting in treating the syrup at a specific gravity of about 17° Baumé and at a temperature of from 80° to 100° C., with a coagulating agent, for example, tannic acid in the proportion of 1 part of acid to 4800 parts of syrup, filtering and treating the mass with a small quantity of bone-char, for instance, $2\frac{1}{2}$ lbs. of bone char to 100 lbs. of syrup on a basis of density of 42° Baumé.

2. A process of refining syrups obtained from modified or thin boiling starch consisting in treating the syrups derived as aforesaid, at a high specific gravity and elevated temperature with a small amount of a suitable coagulating agent, for instance tannic acid, filtering and treating the mass with a small quantity of bone char, substantially as specified.

In testimony, that I claim the foregoing as my invention, I have signed my name in presence of two witnesses, this 15th day of March, 1907.

CHESTER B. DURYEA.

Witnesses:
C. S. SUNDGREN,
HENRY THIEME.